United States Patent Office 3,165,551
Patented Jan. 12, 1965

3,165,551
NEW ANTIBACTERIAL AGENTS
Robert K. Blackwood, Gales Ferry, Hans H. Rennhard, Lyme, John J. Beereboom, Waterford, and Charles R. Stephens, Jr., Niantic, Conn., assignors to Chas. Pfizer & Co., Inc., New York, N.Y., a corporation of Delaware
No Drawing. Filed June 26, 1961, Ser. No. 119,274
11 Claims. (Cl. 260—559)

This application is a continuation-in-part of copending application Serial Number 87,059, filed February 6, 1961,

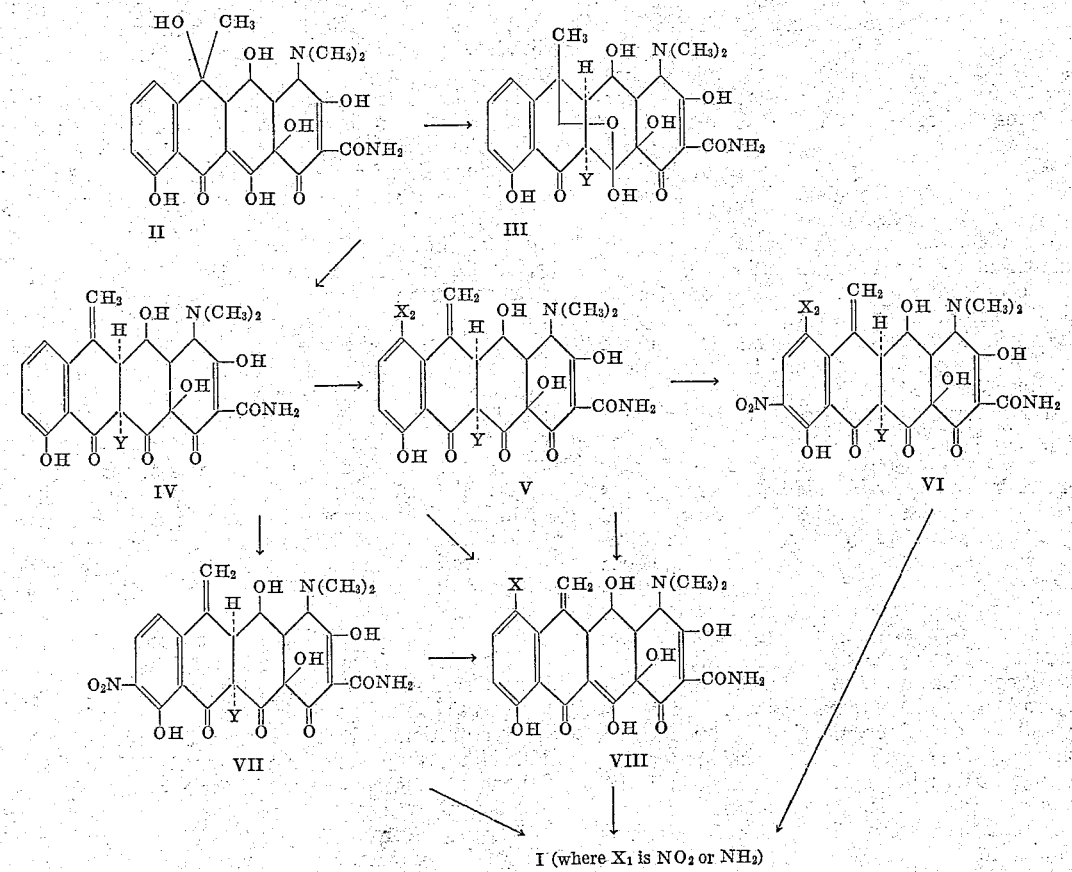

which is a continuation-in-part of application Serial Number 72,857, filed December 1, 1960, which is a continuation-in-part of application Serial Number 31,236, filed May 23, 1960, each of the aforesaid applications now being abandoned.

This invention relates to new and useful antibacterial agents of the tetracycline type, salts thereof as well as intermediates useful for their production.

More particularly, this invention relates to new and useful tetracyclines of the following formula:

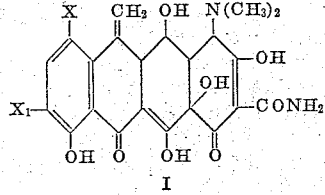

wherein X is selected from the group consisting of hydrogen, chloro, bromo and iodo; and $X_1$ is selected from the group consisting of nitro, amino and lower alkanoylamino.

The present new compounds are hereinafter referred to as 6-deoxy-6-demethyl-6-methylene-5-oxytetracyclines for convenience. These new compounds are useful by virtue of their unexpectedly high antibacterial activity both in vivo and in vitro and/or their use as intermediates for the preparation of compounds of high antibacterial activity as hereinafter described.

The present new compounds are prepared according to the following reaction sequence:

In the above sequence of reactions $X_2$ is halogen (Cl, Br, I) and Y is halogen, preferably fluoro and chloro. This sequence of reactions may be summarized as follows:

II→III, 11a-halogenation;
III→IV, treatment with a strong acid;
IV→V, 7-halogenation;
V→VI ⎫
IV→VII ⎬ nitration
VIII→I ⎭
IV→VIII and V→VIII, 11a-halogenation
VI→I and VII→I, 11a-dehalogenation, and reduction of nitro groups to amino.

Compounds of structure I in which $X_1$ is amino are also prepared by reduction of the corresponding nitro compounds. Compounds of structure I in which $X_1$ is alkanoylamino are prepared by acylation of corresponding amino compounds with a lower alkanoic acid derivative.

The 11a-halogenation is accomplished by merely contacting 5-oxytetracycline with a halogenating agent in a reaction-inert solvent. For the production of 11a-chloro-5-oxytetracycline-6,12-hemiketal a variety of halogenating agents may be used, including chlorine; N-chloro lower alkanoic acid amides, e.g., N-chloroacetamide; hydrocarbon dicarboxylic acid imides, e.g., N-chloro-succinimide, phthalimide and the like; N-lower-alkanoylanilides, e.g., N-chloroacetanilide, propionanilide and the like; 3-chloro- and 3,5-dichloro-5,5-dimethylhydantoin; pyridinium perchloride hydrohalides, e.g., pyridinium perchloride hydrochloride; and lower alkyl hypochlorites, e.g., t-butylhypochlorite. It is obvious that, in general, any chlorinating agent commonly employed in the art is operable, but the above are preferred.

By a "reaction-inert solvent" as employed herein is meant a solvent which, under the conditions of the reaction, does not react in an undesired manner with either starting compounds or final products. A minimum of laboratory experimentation will permit the selection of suitable solvents for the present process. Exemplary of such solvents are dioxane, tetrahydrofuran, acetone, the dimethyl ether of diethylene glycol (diglyme) and the dimethyl ether of ethylene glycol (monoglyme). Temperature does not appear to be critical in this process, temperatures of from −25° to 50° C. being found suitable, and from −15° to 25° C. being preferred. Temperatures above 50 C. should preferably be avoided because of the possibility of degradation and resultant reduction in yield. The selection of the best reaction conditions, e.g. temperature, solvent, chlorinating agent, etc., is a matter of routine experimentation.

The 11a-chloro hemiketal is preferably prepared using a water-miscible solvent system, in which case the product may be obtained by dilution of the reaction mixture with water. The 11a-chloro compound is relatively stable in acidic aqueous solutions.

The preparation of 11a-fluoro-5-oxytetracycline hemiketal is accomplished by contacting oxytetracycline with perchloryl fluoride in the presence of a base, preferably an alkali metal hydroxide or alkoxide. The reaction is usually carried out by dissolving the starting compound in the selected solvent containing at least a molar equivalent of the base and adding perchloryl fluoride, a gas at room temperature, in the usual fashion. As the reaction proceeds, the pH of the solution drops from alkaline to near neutral values, the product usually commencing to separate at a pH of approximately 8. The crystalline product is collected in the usual fashion and dried.

The preparation of the 11a-halo-6-methylene-5-oxytetracyclines (IV) may be accomplished by treating the starting compound (III) with a strong acid of the dehydrating type, such as hydrogen fluoride, or sulfuric, trifluoroacetic, polyphosphoric, or perchloric acid and the like. Of these, the preferred is liquid hydrogen fluoride. Optimum reaction conditions are readily determined by routine experimentation. Generally, the starting compound is merely added to the selected acid and allowed to react. After the reaction is complete, the product is obtained by standard procedures. It is usually most convenient to merely dilute the reaction mixture with a non-solvent, e.g. ether or the like, which results in precipitation of the product as the salt corresponding to the acid used.

For example, the starting compound is added to liquid hydrogen fluoride at 0° to 50° C. and allowed to stand for periods of up to several hours, after which the hydrogen fluoride is permitted to evaporate. The residue is then treated by standard procedures to obtain the product as the crystalline hydrofluoride salt, e.g. by stirring in a non-solvent and recrystallizing from a solvent such as a lower alkanol. The products may be converted to the free base or any desired salt in the usual manner.

7-halogenation is accomplished by merely contacting the starting 11a-halo compound with a halogenating agent in a reaction-inert solvent. A solvent particularly preferred for this reaction is liquid hydrogen fluoride. A number of halogenating agents may be used, including those enumerated hereinbefore, as well as corresponding bromo or iodo compounds, such as N-iodosuccinimide, N-bromosuccinimide and the like. It is usually preferred to use an equimolar amount of brominating, chlorinating or iodinating agent, although an excess of up to about 20 mole percent is also suitable. The time of reaction will vary with the starting compound and the halogenating agent selected. Generally, the reaction is allowed to proceed until a negative starch-iodide test is obtained. Reaction temperatures ranging from −40° up to about 60° C. may be used, although it is usually preferred to employ temperatures between −20° and 40° C. for best results. When the reaction is complete, the product is obtained by any standard isolation method, for example, precipitation of the 7,11a-dihalo compound by concentration of the reaction mixture or by dilution with a non-solvent, e.g. ether or hexane. The product as obtained may be further purified, or utilized directly for the succeeding reactions described hereinafter.

Nitration is accomplished by any of the standard methods. For example, the starting compound is reacted with nitric acid per se or as formed in situ, e.g. from potassium nitrate and sulfuric acid. For best results the nitration is carried out in solvent, preferably liquid hydrogen fluoride. A variety of other solvents may also be used, including lower alkanoic acids such as acetic acid. When hydrogen fluoride is used as solvent, it also acts as proton donor to form nitric acid in situ with nitrate salts. A minimum of laboratory experimentation will permit the selection of other suitable solvents. While the reaction temperature may be varied appreciably, the use of temperatures appreciably above 50° C. should be avoided. Satisfactory results are obtained over a wide range of temperatures, e.g. as low as −20° C. and even lower with hydrogen fluoride as solvent. Reaction time is not particularly critical, in view of the stability of the starting compounds to acid, and the optimum reaction time may be determined by a minimum of laboratory experimentation. Best yields are usually obtained with reaction periods of from about 15 minutes to about 12 hours.

The 11a-dehalogenating may be effected by either chemical or catalytic reduction, using procedure well known to those in the art. Nitro groups, where present, are reduced to amino during 11a-dehalogenation. Catalytic reduction, which is especially suitable for the 11a-chloro compounds, may be conducted in a solvent for the starting compound, in the presence of a noble metal catalyst at atmospheric or superatmospheric hydrogen pressures. Temperature does not appear to be critical in the catalytic hydrogenation. However, temperatures of from 0 to about 20° C. generally give best results and are therefore preferred. Room temperature is eminently suitable. The noble metal catalysts, e.g. palladium or, preferably, rhodium, are advantageously employed on a support such as carbon, in which form they are commonly available. The solvent selected for the hydrogenation should, of course, be reaction-inert, that is, incapable of reaction with the starting compound, the product, or hydrogen, under the conditions of the reaction. A variety of organic solvents may be used, and a minimum of laboratory experimention will permit the selection of a suitable solvent for any specific starting compound. Generally, lower alkanols, e.g. methanol or ethanol, are found most suitable, although a variety or other solvents may be used. Where it is merely necessary to remove 11a-halogen, as in the preparation of compounds VIII an equimolar amount of hydrogen is required. The reaction should be terminated when the calculated amount of hydrogen has been consumed, since the compounds are susceptible to further hydrogenation, e.g. removal of 7-halogen, particularily when palladium is used as catalyst.

A variety of chemical reducing agents may also be used for the 11a-dehalogenation reaction. These include active metals in mineral acids, e.g. zinc or iron in dilute hydrochloric acid; alkali metal hydrosulfites, preferably sodium hydrosulfite, which is commercially available, in aqueous media; and sodium iodide in a halogen-acceptor solvent such as acetone or methanol, preferably in the presence of zinc metal. Of these, reduction with zinc and mineral acids is preferred, particularly with 11a-fluoro starting compounds. When aqueous systems are used in the aforementioned chemical reactions, it is at times desirable to include a water-miscible solvent, particularly when the starting compound is of limited solubility in the aqueous reaction mixture. The water-miscible solvent does not alter the course of the reaction, but merely provides for more efficient reduction, e.g. shorter reaction time, by insuring more intimate contact of the reactants. A large number of solvents are suitable for this purpose, including dimethylformamide, dimethoxyethane, methanol, ethanol, acetone, dioxane, tetrahydrofuran and the like.

The product is obtained from the 11a-dehalogenation reaction mixtures by standard procedures. For example, the catalytic hydrogenation mixtures may be filtered to remove the catalyst and the product precipitated, e.g. by adding a non-solvent such as ether or hexane, or by concentrating, usually under reduced pressure, or by a combination of these measures. Recovery from the chemical reduction mixtures may also be conducted by known procedures, such as precipitation, concentration, or solvent extraction, e.g. with alcohols such as the butanols and pentanols, or by combinations of these procedures.

The isolated products may be further purified by any of the generally known methods for purification of tetracycline compounds. These include recrystallization from various solvents and mixed solvent systems, chromatography, and countercurrent solvent distribution.

The acylation of 9-amino compounds of structure I is accomplished by the usual methods known to those in the art. A preferred method involves acylation of the 9-amino-6-deoxy-6-demethyl - 6-methylene-5-oxytetracycline with an acid anhydride, or obvious equivalent, such as the corresponding acid chloride (in the presence of a base, e.g. a tertiary amine such as pyridine) in a reaction-inert solvent. A particularly formylating agent is acetoformic acid, which is prepared by mixing 1 volume of 100% formic acid with two volumes of acetic anhydride. The resulting reagent provides one equivalent per 72 ml.

The reduction of the 9-nitro-6-deoxy-6-demethyl-6-methylene-5-oxytetracyclines to corresponding 9-amino compounds is accomplished by the usual methods for converting nitro compounds to amino. The reducing agent hereinbefore described for 11a-dehalogenation are also useful for this purpose. As is obvious, other well known reducing agents may also be used.

In the aforementioned D-ring substitution reactions, i.e. halogenation and nitration, liquid hydrogen fluoride is the preferred solvent, not only for reaction efficiency, but also because its use permits consecutive reactions to be conducted without isolation of intermediate compounds. For example, 11a-chloro - 5 - oxetetracycline-6,12-hemiketal is dissolved in liquid hyrdogen fluoride to obtain 11a-chloro-6-deoxy-6-demethyl-6-methylene-5-oxytetracycline, which in situ, may be nitrated or halogenated and then nitrated to produce 9-nitro or 7-halo-9-nitro derivatives. Thus, the use of this solvent eliminates the necessity of costly and time-consuming isolation and recovery procedures. Of course, it may at times be preferred to isolate and purify intermediate compounds for more rigid process control. Nevertheless, distinct advantages are realized with liquid hydrogen fluoride in the present process as described hereinafter in the examples. For best results, it is preferred that the hydrogen fluoride be substantially anhydrous, although the presence of trace amounts of water is not seriously objectionable.

In the D-ring substitution reactions, i.e. halogenation and nitration, the principal products obtained are 7-halo and 9-nitro compounds respectively. Also produced in these reactions in lesser amounts are the corresponding 9-halo and 7-nitro compounds, as well as those in which nitration occurs in the 6-methylene group. The co-produced isomers are separable by standard techniques such as column chromatography and/or countercurrent distribution.

The present new compounds of structure I herein with the exception of 9-nitro compounds are useful by virtue of their high order of activity against a variety of microorganisms, both in vivo and in vitro. 9-nitro compounds generally are of a lower order of activity. These nitro compounds are useful for the preparation of corresponding 9-amino compounds as described herein.

The new 9-amino- and 9-alkanoylamino-6-deoxy-6-demethyl-6-methylene-5-oxytetracyclines are distinguished by a number of important advantages, particularly their high in vitro potency and remarkable freedom from serum binding, as well as the excellent in vivo protection against infection which they confer. Thus, the minimum inhibitory concentration of 9-amino-7-chloro-6-deoxy-6-demethyl-6-methylene-5-oxytetracycline vs. representative microorganisms in vitro (as determined by the well known serial dilution technique) illustrates the unexpected advantages conferred by the amino group of these new compounds:

| Organism | Minimum Inhibitory Concentration (mcg./ml.) | | | |
| --- | --- | --- | --- | --- |
| | 1A | 1B | 2A | 2B |
| Staph. aureus | 0.58 | 12.5 | 0.39 | 83 |
| Strept. pyogenes | 0.19 | 4.16 | 0.19 | 50 |
| S. agalactiae | 0.19 | 2.86 | 0.29 | 50 |
| Listeria monocytogenes | 0.19 | 3.12 | 0.39 | 33 |
| Pasteurella multocida | 0.19 | 2.60 | 0.39 | 42 |

1A = 9-amino-7-chloro-6-deoxy-6-demethyl-6-methylene-5-oxytetracycline in Brain-heart infusion.
1B = same in Brain-heart infusion plus 50% human serum.
2A = 7-chloro-6-deoxy-6-demethyl-6-methylene-5-oxytetracycline in Brain-heart infusion.
2B = same in Brain-heart infusion plus 50% human serum.

The remarkable effect of the 9-amino group in minimizing serum-inactivation is clear from the table.

The $PD_{50}$ of 9-amino-7-chloro-6-deoxy-6-demethyl-6-methylene-5-oxytetracycline vs. *Staph. aureus* is 1.80 mg./kg. in mice; i.e., a subcutaneous dose of 1.80 mg./kg. of the antibiotic protects 50% of the animals against this organism.

The present new 6-methylene compounds of Formula I may be formulated into various dosage form compositions, such as those employed with oxytetracycline. They are also useful therapeutically or as growth stimulants in feeds, in veterinary practice and agriculture.

For human therapy, the usual oral dosage of the present new compounds for the average adult is from about 0.1 to about 2 g. per day. The product may be formulated into capsules or tablets containing from 25 to 250 mg. of antibiotic on an activity basis. Suspensions or solutions in various vehicles may also be prepared, at concentrations ranging from 5 to 125 mg./ml. For parenteral administration intramuscularly or intravenously, the daily dose is reduced to about .05 to 1.0 g. Intramuscular formulations comprise solutions of the antibiotic at concentrations ranging from 50 to 100 mg./ml. Intravenous administration is by means of isotonic solutions having antibiotic concentration of about 10 mg./ml. Both types of parenteral products are conveniently distributed as solid compositions for reconstitution. These products may also be used for topical application in the usual media. In all instances, of course, the attending physician will select the dosage to suit the needs of the particular patient. For children, smaller doses are generally used.

The present invention embraces all salts, including acid-addition and metal salts, of the newly recognized amphoteric antibiotics. The well known procedures for preparing salts of tetracycline compounds are applicable here and are illustrated by examples appearing hereinafter. Such salts may be formed with both pharmaceutically acceptable and pharmaceutically unacceptable acids and metals. By "pharmaceutically acceptable" is meant those salt-forming acids and metals which do not substantially increase the toxicity of the amphoteric antimicrobial agent.

The preferred salts are the acid addition salts and pharmaceutically acceptable metal salts.

The pharmaceutically acceptable acid addition salts are of particular value in therapy. These include salts of mineral acids such as hydrochloric, hydriodic, hydrobromic, phosphoric, metaphosphoric, nitric and sulfuric acids, as well as salts of organic acids such as tartaric, acetic, citric, malic, benzoic, glycollic, gluconic, gulonic, succinic, arylsulfonic, e.g. p-toluene-sulfonic acids, and the like. The pharmaceutically unacceptable acid addition salts, while not useful for therapy, are valuable for isolation and purification of the newly recognized antibiotics. Further, they are useful for the preparation of pharmaceutically acceptable salts. Of this group, the more common salts include those formed with hydrofluoric and perchloric acids. Hydrofluoride salts are particularly useful for the preparation of the pharmaceutically acceptable salts, e.g. the hydrochloride, by solution in hydrochloric acid and crystallization of the hydrochloride salt formed. The perchloric acid salts are useful for purification and crystallization of the new antibiotics.

Whereas all metal salts may be prepared and are useful for various purposes, the pharmaceutically acceptable metal salts are particularly valuable because of their utility in therapy. The pharmaceutically acceptable metals include more commonly sodium, potassium and alkaline earth metals of atomic number up to and including 20 i.e. magnesium and calcium, and additionally, aluminum, zinc, iron and manganese, among others. Of course, the metal salts include complex salts, i.e. metal chelates, which are well recognized in the tetracycline art. The pharmaceutically unacceptable metal salts embrace most commonly salts of lithium and of alkaline earth metals of atomic number greater than 20, i.e. barium and strontium, which are useful for isolation and purifying the antibiotics. Since the new antibiotics are amphoteric, they also form salts with amines of sufficient basicity.

It will be obvious that, in addition to their value in therapy, the pharmaceutically acceptable acid and metal salts are also useful in isolation and purification.

The following examples are given by way of illustration and should not be construed as limiting the invention, many variations of which are possible within the scope and spirit thereof.

EXAMPLE I

*11a-Fluoro-5-Oxytetracycline-6,12-Hemiketal*

To a mixture of 6.9 g. of anhydrous oxytetracycline base dissolved in 285 ml. of methanol cooled in an ice bath is added 1 equivalent of 1 N sodium methoxide-methanol solution. The yellow sodium salt precipitates. Perchloryl fluoride is bubbled in and the sodium salt redissolves. As the mixture nears neutrality a heavy precipitate starts to form. The excess percholoryl fluoride is swept out with a stream of nitrogen and the product is filtered off, washed with cold methanol and dried under vacuum at room temperature to obtain 5.1 g. of pale yellow crystals. The infrared spectrum shows no carbonyl absorption below 6 microns. Ultraviolet absorption maxima are observed at 265 and 336 m$\mu$. After recrystallization from water, elemental analysis is as follows:

Calcd. for $C_{22}H_{23}O_9N_2F \cdot 2H_2O$: C, 51.4; H, 5.25, N, 5.5. Found: C, 51.2; H, 5.3, N, 5.7.

EXAMPLE II

*11a-Chloro-5-Oxytetracycline-6,12-Hemiketal*

Twenty-three grams of anhydrous oxytetracycline is dissolved in 250 ml. of 1,2-dimethoxyethane and 8 g. of N-chlorosuccinimide is added. The mixture is stirred for two minutes and then poured into a liter of stirred water. The product which separates is collected by filtration, water-washed and dried. Infrared analysis of the product (1% concentration in KBr) shows no carbonyl absorption in the 5–6 micron region, but shows the following principal peaks: 6.12, 6.35, 6.66, 6.85, 7.22, 7.55, 7.75, 7.92, 8.14, 8.36, 8.78, 9.18, 9.43 microns.

EXAMPLE III

*11a-Chloro-6-Deoxy-6-Demethyl-6-Methylene-5-Oxytetracycline*

Five grams of 11a-chloro-5-oxytetracycline-6,12-hemiketal is added to 15 ml. of dry, liquid hydrogen fluoride, and the mixture is stirred for 3.5 hours at ice-bath temperature. The hydrogen fluoride is evaporated by warming under a flow of nitrogen gas to obtain the product as the hydrofluoride salt.

The crude hydrofluoride is dissolved in water and concentrated hydrochloric or 70% perchloric acid added dropwise to precipitate the hydrochloride or perchlorate salt respectively. The hydriodide salt is precipitated from acetone solution of the crude hydrofluoride salt by addition of 47% hydriodic acid.

Alternatively, the original reaction mixture is diluted with 6–7 volumes of water and ice and perchloric acid or naphthalene sulfonic acid (concentrated acid) added to precipitate the corresponding salts. Dilution of the original reaction mixture with acetone followed by addition of HI precipitates the hydriodide salt.

The hydriodide salt exhibits the following elemental analysis:

Calcd. for $C_{22}H_{21}N_2O_8Cl \cdot HI$: C, 43.7; H, 3.7; N, 4.6; Cl, 5.8. Found: C, 44.0; H, 4.0; N, 4.2; Cl, 5.5.

Ultraviolet absorption maxima appear at 222, 270 and 372 m$\mu$. Infrared absorption peaks appear at 3.05, 3.2, 5.7, 6.02, 6.03, 6.22, 6.4, 6.88, 7.4, 7.8, 8.1, 8.9 and 9.1 microns. The perchlorate salt exhibits ultraviolet absorption maxima at 237, 270 and 372 m$\mu$.

11a-fluoro-6-deoxy-6-demethyl-6-methylene-5-oxytetracycline is prepared in the same manner, substituting 11a-fluoro-5-oxytetracycline-6, 12-hemiketal as the starting compound.

EXAMPLE IV

*6-Deoxy-6-Demethyl-6-Methylene-5-Oxytetracycline*

*Method A.*—To a solution of 5 g. of the product of Example III (as the hydriodide) in 125 ml. of dilute hydrochloric acid (1 part conc. HCl in 55 parts of water) at 20° C. is added 2 g. of zinc dust. After stirring for 10 minutes, the zinc is filtered off and the filtrate is adjusted to pH 0.8 and extracted with butanol. The butanol extract is evaporated at reduced pressure, and the residue triturated with ether. The ether-insoluble solid is crystallized from methanol-acetone-conc. HCl-ether to obtain 2.5 g. of product as the hydrochloride monomethanolate, melting at 205° C. with decomposition. Ultraviolet analysis in 0.01 N NCl in methanol reveals maxima at 252 m$\mu$, $E_{1cm.}^{1\%} = 450$ and 345 m$\mu$, $E_{1cm.}^{1\%} = 302$ in 0.01 N NaOH in methanol, at 235 m$\mu$, $E_{1cm.}^{1\%} = 442$; 254 m$\mu$, $E_{1cm.}^{1\%} = 408$; and 385 m$\mu$, $E_{1cm.}^{1\%} = 329$ in 0.01 N MgCl$_2$ in methanol, at 240 m$\mu$, $E_{1cm.}^{1\%} = 461$; 277 m$\mu$, $E_{1cm.}^{1\%} = 326$; and 351 m$\mu$, $E_{1cm.}^{1\%} = 282$ Infrared analysis shows principal peaks at 6.03, 6.2, 6.37 and 6.87 microns. Elemental analysis of the product gives C, 55.9; H, 5.2; N, 5.5; Cl, 7.0; OCH₃, 3.4. The product shows Rf values of 0 and 0.35 respectively in the following systems:

|  | Mobile Phase | Immobile Phase |
|---|---|---|
| (1) | 20:3 toluene-pyridine saturated with pH 4.2 buffer. | pH 4.2 aqueous buffer. |
| (2) | 20:10:3 nitromethane, chloroform pyridine saturated with pH 3.5 buffer. | pH 3.5 aqueous buffer. |

*Method B.*—A mixture of 1 g. of the 11a-chloro product of Example III in 10 ml. of methanol containing 200 mg. of 5% rhodium on carbon is hydrogenated at room temperature and 1 atmosphere hydrogen pressure until an equimolar amount of hydrogen is consumed (2 hours). The catalyst is filtered, the filtrate evaporated to dryness and the residue crystallized as in Method A.

*Method C.*—A mixture of 1 g. of the 11a-chloro product of Example III in 70 ml. of water containing 1 g. of sodium hydrosulfite is stirred for 30 minutes at room temperature. The mixture is then extracted with butanol and the butanol extract evaporated to dryness. The residue is recrystallized as in Method A.

*Method D.*—Using the procedure of Method A, 11a-fluoro - 6 - deoxy - 6 - demethyl-6-methylene-5-oxytetracycline perchlorate salt is reduced to 6-deoxy-6-demethyl-6-methylene-5-oxytetracycline.

The crystalline hydrochloride-methanolate product of this example may be recrystallized from isopropanol as 6-deoxy-6-demethyl-6-methylene-5-oxytetracycline hydrochloride. The recrystallized product shows infrared absorption peaks at 3.1, 3.75, 6.02, 6.23, 6.36, 6.55, 6.9, 7.35, 7.6, 7.8, 8.15, 8.26, 8.5, 9.27, 9.95, 10.55, 10.8, 11.53, 11.93 and 12.15 microns.

EXAMPLE V

*7,11-Dichloro-6-Deoxy-6-Demethyl-6Methylene-5-Oxytetracycline*

*Method A.*—To 5 g. of 11a-chloro-6-deoxy-6-demethyl-6-methylene-5-oxytetracycline hydriodide in 15 ml. of liquid hydrogen fluoride cooled at ice bath temperature, is added 1.5 g. of N-chlorosuccinimide. The solution is stirred at ice bath temperature for 1.5 hours. The product is precipitated by the addition of 500 ml. of ether and recovered by filtration.

The crude product is taken up in methanol at room temperature, filtered and the filtrate treated with activated carbon, again filtered and then evaporated at reduced pressure. The residue is crystallized from dilute hydrochloric acid in the form of the hydrochloride. Ultraviolet absorption maxima appear in the 0.01 N HCl in methanol at 239 m$\mu$, $$E^{1\%}_{1\,cm.} = 352$$

and 378 m$\mu$, $$E^{1\%}_{1\,cm.} = 60$$

with inflection at 258 m$\mu$, $$E^{1\%}_{1\,cm.} = 324$$

Infrared analysis shows principal bands at 5.7, 6.0 and 6.9 microns.

*Method B.*—Five grams of 11a- -chloro-5-oxytetracycline-6,12-hemiketal is added to 15 ml. of liquid hydrogen fluoride at ice-bath temperature. After stirring for 3.5 hours at ice-bath temperature, the reaction mixture is treated with N-chlorosuccinimide by the procedure of Method A.

As an alternative and somewhat more convenient recovery procedure, after the removal of most of the liquid hydrogen fluoride, 100 ml. of water is added, followed by 5 g. of β-naphthalenesulfonic acid. The product precipitates as the β-naphthalenesulfonic acid salt and is collected by filtration.

Still another recovery procedure involves dilution of the original reaction mixture with 6–7 volumes of water, followed by dropwise addition of concentrated acid to precipitate the perchlorate or β-naphthalene sulfonate salts, as described in Example III. The perchlorate salt crystallizes from isopropanol in the form of long needles having UV maxima at 260 and 377 m$\mu$ with an inflection at 260 m$\mu$. Infrared peaks appear at 5.7, 6.0, 6.26, 6.55, 6.88, 7.2, 7.85 and 8.35 microns.

EXAMPLE VI

*7-Chloro-6-Deoxy-6-Demethyl-6-Methylene-5-Oxytetracycline*

*Method A.*—To a solution of 0.5 g. of 7,11a-dichloro-6-deoxy-6-demethyl-6-methylene - 5 - oxytetracycline perchlorate in 7.5 ml. of water is added 0.45 g. of sodium hydrosulfite and the resulting mixture is stirred for 12 minutes. The product separates and is collected by filtration.

*Method B.*—Twenty grams of the β-naphthalene sulfonate salt of the previous example is suspended in 500 ml. of methanol containing 5 g. of 5% rhodium on carbon and the mixture is hydrogenated at room temperature and 1 atmosphere hydrogen pressure. After the absorption of 700 ml. of hydrogen the reaction mixture is filtered and the filtrate evaporated to 15.4 g. dry residue.

A methanolic solution of 11 g. of the residue is adjusted to pH 6.5 with triethylamine and passed over an 8 x 100 cm. column containing 2 kg. of cellulose powder in water. The column is eluated with ethyl acetate saturated with water and 45 ml. fractions are collected. The elution pattern is followed by paper chromatography and fractions 132 to 260 are combined, evaporated to dryness, and the residue slurried in ether and filtered to give 2.74 g. of purified amorphous, amphoteric product. 1.6 g. of the product is crystallized from 40 ml. of methanol to obtain 890 mg. of the amphoteric base. Infrared absorption peaks occur at 2.96, 3.29, 3.42, 6.06, 6.18, 6.30, 6.58, 6.88, 7.19, 7.48, 7.70, 8.23, 9.06, 9.88, 10.63, 10.92, 11,55 and 11.76 microns. Ultraviolet analysis is as follows: in 0.01 N HCl in methanol, maxima at 247 m$\mu$ (log $\epsilon$=4.28) and 346 m$\mu$ (log $\epsilon$=4.02) with inflection at 370 m$\mu$ (log $\epsilon$=3.98); in 0.01 N NaOH in methanol, maxima at 234 m$\mu$ (log $\epsilon$=4.24), 253 m$\mu$ (log $\epsilon$=4.22) and 389 m$\mu$ (log $\epsilon$=4.12) with inflection at 284 m$\mu$ (log $\epsilon$=4.07); in 0.01 M MgCl₂ in methanol, maxima at 241 m$\mu$ (log $\epsilon$=4.32); 349 m$\mu$ (log $\epsilon$=4.04); with a shoulder at 372 m$\mu$ (log $\epsilon$=4.02).

The product has the following Rf values:

| Rf | Solvent system | |
|---|---|---|
|  | Mobile Phase | Immobile Phase |
| 0.35 | Ethyl acetate saturated with water. | Aqueous phosphate buffer (pH 3). |
| 0.33 | do | McIlvaine buffer pH 4.2. |

This product is also obtained by hydrogenation of the crystalline perchlorate of the preceding example followed by crystallization from methanol and 70% perchloric acid. The perchlorate product has the same ultraviolet spectra as the amphoteric base.

*Method C.*—This product is also obtained by reduction of the starting compound of Method A with zinc and acid by the procedure of Example IV.

EXAMPLE VII

*7-Bromo-11a-Chloro-6-Deoxy-6-Demethyl-6-Methylene-5-Oxytetracycline*

This product is prepared by the procedures of Method A and B of Example V substituting an equivalent amount of N-bromosuccinimide in place of N-chlorosuccinimide.

EXAMPLE VIII

*7-Bromo-6-Dexoxy-6-Demethyl-6-Methylene-5-Oxytetracycline*

This product is obtained from the Example VII product by the sodium hydrosulfite treatment described in Example VI.

The following compounds are prepared from the corresponding 7-deshalo compounds by the procedure of the previous examples:

7-chloro-11a-fluoro-6-deoxy-6-demethyl-6-methylene-5-oxytetracycline
7-iodo-11a-chloro-6-deoxy-6-demethyl-6-methylene-5-oxytetracycline
7-bromo-11a-fluoro-6-deoxy-6-demethyl-6-methylene-5-oxytetracycline These compounds are converted to the corresponding 11a-deshalo compounds by the aforementioned procedures.

EXAMPLE IX

*7-Chloro-9-Nitro-6-Deoxy-6-Demethyl-6-Methylene-5-Oxytetracycline*

To a solution of 1.0 g. of 7-chloro-6-deoxy-6-demethyl-6-methylene-5-oxytetracycline base in 8 ml. of anhydrous liquid hydrogen fluoride at 0° C. is added 220 mg. of $KNO_3$. The mixture is stirred for 30 minutes at 0° C. and the HF evaporated under nitrogen. The residue is slurried in dry ether, filtered and dried. The product shows the following Rf values in the indicated solvent systems:

| Rf | Solvent System | |
|---|---|---|
| | Mobile Phase | Immobile Phase |
| 0.2 | Ethyl acetate saturated with water. | pH 3 aqueous phosphate buffer. |
| 0.55 | Nitromethane, toluene, pyridine (20:10:3). | pH 3.5 McIlvaine buffer. |

Ultraviolet analysis in 0.01 M NaOH—MeOH shows maxima at 248, 341 and 447 mμ, with a shoulder at 275 mμ. Bioassay shows a value of less than 100 mcg./ml. (*K. pneumoniae* assay vs. 1000 mcg./mg. oxytetracycline standard).

EXAMPLE X

*9-Nitro-7,11a-Dichloro-6-Deoxy-6-Demethyl-6-Methylene-5-Oxytetracycline*

To a solution of 600 mg. of 7,11a-dichloro-6-deoxy-6-demethyl-methylene-5-oxytetracycline perchlorate in 1.5 ml. of anhydrous liquid hydrogen fluoride is added 100 mg. of $KNO_3$. The mixture is stirred at 5° C. for 15 minutes, then poured into 75 ml. of ice/water and finally filtered. The filtrate is evaporated to dryness to obtain the product.

EXAMPLE XI

*9-Nitro-6-Deoxy-6-Demethyl-6-Methylene-5-Oxytetracycline*

To a mixture of 500 mg. of 6-deoxy-6-demethyl-6-methylene-5-oxytetracycline in 1.5 ml. of anhydrous liquid hydrogen fluoride is added 100 mg. of $KNO_3$. The mixture is stirred at 15° C. for 30 minutes and then evaporated to dryness. The residue is slurried in ether and filtered to obtain the crude solid product, which is slurried in 5% aqueous HCl and extracted with butanol. The butanol extract is concentrated to obtain the product, which is recrystallized from water with hydrochloric acid.

EXAMPLE XII

*9-Nitro-11a-Chloro-6-Deoxy-6-Demethyl-6-Methylene-5-Oxytetracycline*

A solution of 5 g. of 11a-chloro-5-oxytetracycline-6,12-hemiketal in 10 ml. of anhydrous hydrogen fluoride is allowed to stand for 15 minutes, after which 1.2 g. of $KNO_3$ is added with stirring. Stirring is continued for one hour at ice bath temperature, and the mixture is then added to 200 ml. of dry ether, filtered, and the solid obtained is washed with ether to obtain crude product.

EXAMPLE XIII

*7-Chloro-9-Amino-6-Deoxy-6-Demethyl-6-Methylene-5-Oxytetracycline*

1.3 g. zinc dust is added with stirring to a solution of 1.42 g. of 7-chloro-9-nitro-6-deoxy-6-demethyl-6-methylene-5-oxytetracycline dissolved in 50 ml. of water and 2 ml. of conc. HCl at 20° C. After 15 minutes, the mixture is filtered, the pH adjusted to 2.5 and the mixture is extracted with five 30 ml. portions of butanol. The combined butanol extracts on concentration give 760 mg. of product in the form of a dihydrochloride. Bioassay vs. *K. pneumoniae* gives a value of 2800 mcg./mg. Ultraviolet analysis in 0.01 N MeOH—HCl shows maxima at 262 and 348 mμ; in 0.01 N MeOH—NaOH, at 246 and 380 mμ.

The product shows Rf values as follows:

| Rf | Solvent System | |
|---|---|---|
| | Mobile Phase | Immobile Phase |
| 0.2 | Ethyl acetate saturated with water. | pH 3 aqueous buffer. |
| 0.35 | Nitromethane, chloroform, pyridine (20:10:3). | pH 3.5 McIlvaine buffer. |

This product is also obtained by reduction of 9-nitro-7,11a-dichloro-6-deoxy-6-demethyl-5-oxytetracycline with aqueous sodium hydrosulfite.

EXAMPLE XIV

*9-Amino-6-Deoxy-6-Demethyl-6-Methylene-5-Oxytetracycline*

This product is obtained by reduction of the corresponding 9-nitro compound with sodium hydrosulfite or $SnCl_2$ in hydrochloric acid.

EXAMPLE XV

*11a-Chloro-9-Nitro-6-Deoxy-6-Demethyl-6-Methylene-5-Oxytetracycline*

To 1 g. of 11a-chloro-6-deoxy-6-demethyl-6-methylene-5-oxytetracycline in 20 ml. of acetic acid is added 1 ml. of conc. $HNO_3$. The mixture is allowed to stand for 12 hours, then evaporated to ¼ of the original volume and 200 ml. of ether is then added. The product separates as the nitrate salt and is collected by filtration.

The corresponding 11a-fluoro compound is prepared in the same fashion.

EXAMPLE XVI

*9-Amino-6-Deoxy-6-Demethyl-6-Methylene-5-Oxytetracycline*

The product of the previous example is reduced according to the procedures of Example IV to obtain this compound.

This product is also obtained by chemical or catalytic reduction of 9-nitro-6-deoxy-6-demethyl-6-methylene-5-oxytetracycline.

EXAMPLE XVII

*7,11a-Dichloro-9-Nitro-6-Deoxy-6-Demethyl-6-Methylene-5-Oxytetracycline*

One gram of 7,11a-dichloro-6-deoxy-6-demethyl-6-methylene-5-oxytetracycline hydrochloride is dissolved in 20 ml. of acetic acid and 1 ml. of conc. $HNO_3$ is added. The mixture is allowed to stand for 12 hours and then concentrated to ¼ of the original volume. It is added dropwise to 200 ml. of ether with stirring at ice-bath temperature. Stirring is continued for 3 hours and the solid is then recovered by filtration, slurried several times in ether, and then dried to obtain the product as the hydrochloride salt.

Using the same procedure, the following products are obtained from corresponding starting compounds:

7-chloro-11a-fluoro-9-nitro-6-deoxy-6-demethyl-6-methylene-5-oxytetracycline
7-bromo-11a-chloro-9-nitro-6-deoxy-6-demethyl-6-methylene-5-oxytetracycline
7-chloro-11a-fluoro-9-nitro-6-deoxy-6-demethyl-6-methylene-5-oxytetracycline
7-iodo-11a-fluoro-9-nitro-6-deoxy-6-demethyl-6-methylene-5-oxytetracycline These products are converted to 7-bromo, 7-iodo and 7 - chloro - 9 - amino-6-deoxy-6-demethyl-6-methylene-5-oxytetracycline by the reduction procedures of the previous examples.

EXAMPLE XVIII

*9-Formylamino-6-Deoxy-6-Demethyl-6-Methylene-5-Oxytetracycline*

To a solution of 4.5 g. of 9-amino-6-deoxy-6-demethyl-6-methylene-5-oxytetracycline base in 40 ml. of dry pyridine is added 20 ml. of acetoformic acid at ice bath temperature. The mixture is stirred for 15 minutes at ice bath temperature and added dropwise to one liter of dry ether. The product is filtered, reslurried in ether and filtered again.

The crude product is suspended in 100 ml. of water, providing a solution of pH 4.2, and stirred for ten minutes to hydrolyze O-formyl groups. The pH of the mixture is then adjusted to pH 5.5 and the solution freeze-dried to obtain crude product which is chromatographed on a column of cellulose powder to obtain purified product as the main fraction.

EXAMPLE XIX

*9-Acetylamino-6-Deoxy-6-Demethyl-6-Methylene-5-Oxytetracycline*

To a solution of 4.2 g. of the starting compound of Example XVIII in 200 ml. of dry tetrahydrofuran and 200 ml. of dry methanol is added 20 ml. of acetic anhydride and the mixture is stirred for 45 minutes at room temperature. The mixture is then stripped of most of the solvent and dropped into dry ether. The rsulting slurry is then filtered, and the solid cake reslurried in ether, filtered and dried to obtain crude product.

The product is chromatographed as in Example XVIII to obtain purified product as the main fraction.

Employing the procedures of Examples XVIII and XIX, the following products are prepared:

9-formylamino-7-chloro-6-deoxy-6-demethyl-6-methylene-5-oxytetracycline
9-acetylamino-7-chloro-6-deoxy-6-demethyl-6-methylene-5-oxytetracycline
9-butylylamino-7-chloro-6-deoxy-6-demethyl-6-methylene-5-oxytetracycline
9-propionylamino-6-deoxy-6-demethyl-6-methylene-5-oxytetracycline
9-valerylamino-6-deoxy-6-demethyl-6-methylene-5-oxytetracycline

EXAMPLE XX

*Metal salts.*—The sodium salt of 9-amino-6-deoxy-6-demethyl-6-methylene-5-oxytetracycline is prepared by dissolving the amphoteric substance in water containing an equimolar amount of sodium hydroxide and freeze drying the resulting mixture.

In this fashion, other metal salts are prepared, including potassium, calcium, barium, lithium, and strontium salts.

The metal salt complexes of the present new tetracyclines are prepared by dissolving them in a lower aliphatic alcohol, preferably methanol, and treating with an equimolar amount of the selected metal salt, preferably dissolved in the selected alcohol. The complexes are isolated in some instances by simple filtration, but often, since many of them are alcohol-soluble, by evaporation of the solvent or addition of a non-solvent such as diethyl ether.

In this fashion, metal salt complexes of the present new tetracyclines consisting primarily of compounds containing a 1:1 ratio of metal to tetracycline are prepared employing the following metal salts: calcium chloride, cobalt chloride, magnesium sulfate, magnesium chloride, stannous chloride, zinc chloride, cadmium chloride, barium chloride, silver nitrate, stannous nitrate, strontium nitrate, magnesium acetate, manganous acetate, palladium chloride, maganous chloride, cerium chloride, titanium chloride, platinum chloride, vanadium chloride, plumbous acetate stannous bromide, zinc sulfate, chromous chloride and nickelous chloride.

EXAMPLE XXI

*Acid addition salts.*—Amphoteric 9-amino-6-deoxy-6-demethyl-6-methylene-5-oxytetracycline is dissolved in methanol containing two moles of hydrogen chloride per mole of the tetracycline compound. The dihydrochloride salt is then precipitated by addition of ether, and is collected by filtration and dried. The hydrochloride may be recrystallized from butanol, butanol-hydrochloric acid, acetone, acetone-hydrochloric acid or methanol-hydrochloric acid. The monohydrochloride is prepared in the same fashion, employing an equimolar proportion of hydrogen chloride.

In the same manner, acid addition salts of 7-chloro-9-amino - 6 - deoxy - 6 - demethyl - 6 - methylene - 5 - oxytetracycline are prepared using, in lieu of hydrochloric acid, sulfuric, nitric, perchloric, hydrobromic, phosphoric, hydrofluoric, p-toluenesulfonic, hydriodic, tartaric, acetic, citric, malic, benzoic, glycollic, gluconic, gulonic, succinic, sulfosalicyclic acids.

EXAMPLE XXII

A suspension of 9-amino-6-deoxy-6-demethyl-6-methylene-5-oxytetracycline is prepared with the following compositions:

| | | |
|---|---|---|
| Antibiotic | g | 31.42 |
| 70% aqueous sorbitol | g | 714.29 |
| Glycerine, U.S.P. | g | 185.35 |
| Gum acacia (10% solution) | ml | 100 |
| Polyvinyl pyrrolidone | g | 0.5 |
| Butyl parahydroxybenzoate (preservative) | g | 0.172 |
| Propyl parahydroxybenzoate (preservative) | g | 0.094 |
| Water, distilled to make 1 liter. | | |

To this suspension, various sweetening and flavoring agents, as well as acceptable colors, may be added by choice. The suspension contains approximately 25 mg. of antibiotic activity per milliliter.

EXAMPLE XXIII

A solution of 9-amino-6-deoxy-6-demethyl-6-methylene-5-oxytetracycline is prepared with the following compositions:

| | | |
|---|---|---|
| Antibiotic | g | 30.22 |
| Magnesium chloride hexahydrate | g | 12.36 |
| Monoethanolamine | ml | 8.85 |
| Propylene glycol | g | 376 |
| Water | ml | 94 |

The solution has a concentration of 50 mg./ml. and is suitable for parenteral and especially for intramuscular administration.

EXAMPLE XXIV

A tablet base is prepared by blending the following ingredients in the proportion by weight indicated:

| | |
|---|---|
| Sucrose, U.S.P. | 80.3 |
| Tapioca starch | 13.2 |
| Magnesium stearate | 6.5 |

Into this base there is blended sufficient 7-chloro-9-amino-6-deoxy-6-demethyl-6-methylene-5-oxytetracycline to provide tablets containing 25, 100 and 250 mg. of active ingredients.

EXAMPLE XXV

A blend is prepared containing the following ingredients (proportions given in parts by weight):

| | |
|---|---|
| Calcium carbonate, U.S.P. | 17.6 |
| Dicalcium phosphate | 18.8 |
| Magnesium trisilicate, U.S.P. | 5.2 |
| Lactose, U.S.P. | 5.2 |
| Potato starch | 5.2 |
| Magnesium stearate A | 0.8 |
| Magnesium stearate B | 0.35 |

To this blend is added sufficient 7-chloro-9-amino-6-deoxy-6-demethyl-6-methylene-5-oxytetracycline to provide capsules containing 25, 100 and 250 mg. of active ingredients.

EXAMPLE XXVI

One thousand grams of 9-amino-7-chloro-6-deoxy-6-demethyl-6-methylene-5-oxytetracycline are intimately mixed and ground with 2500 grams of sodium ascorbate. The ground, dry mixture is filled into vials, sterilized with ethylene oxide and the vials sterilely stoppered. For intravenous administration sufficient water is added to the vials to form a solution containing 10 mg. of active ingredient per milliliter.

What is claimed is:

1. A compound selected from the group consisting of compounds of the formula:

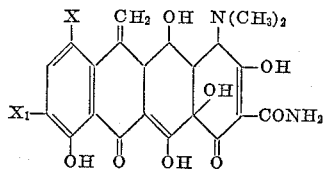

in which X is selected from the group consisting of hydrogen, chloro, iodo and bromo, $X_1$ is selected from the group consisting of amino and lower alkanoylamino;
and acid addition salts and pharmaceutically acceptable metal salts thereof.

2. A compound selected from the group consisting of compounds of the formula:

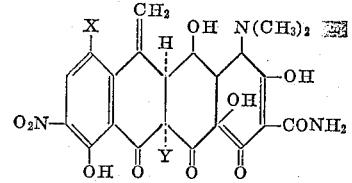

in which X is selected from the group consisting of hydrogen, chloro, iodo and bromo, Y is selected from the group consisting of chloro and fluoro;
and acid addition salts thereof.

3. 9 - amino - 6 - deoxy - 6 - demethyl - 6 - methylene-5-oxytetracycline.

4. 7 - chloro - 9 - amino - 6 - deoxy - 6 - demethyl - 6-methylene-5-oxytetracycline.

5. 11a - chloro - 9 - nitro - 6 - deoxy - 6 - demethyl - 6-methylene-5-oxytetracycline.

6. 11a - fluoro - 9 - nitro - 6 - deoxy - 6 - methyl - 6-methylene-5-oxytetracycline.

7. 7,11a - dichloro - 9 - nitro - 6 - deoxy - 6 - demethyl-6-methylene-5-oxytetracycline.

8. 7 - chloro - 11a - fluoro - 9 - nitro - 6 - deoxy - 6-demethyl-6-methylene-5-oxytetracycline.

9. A compound selected from the group consisting of compounds of the formula:

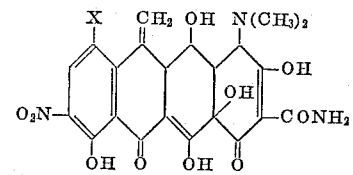

in which X is selected from the group consisting of hydrogen, chloro, iodo and bromo;
and acid addition salts and pharmaceutically acceptable metal salts thereof.

10. 9 - nitro - 6 - deoxy - 6 - demethyl - 6 - methylene-5-oxytetracycline.

11. 7 - chloro - 9 nitro - 6 - deoxy - 6 - demethyl - 6-methylene-5-oxytetracycline.

References Cited by the Examiner

UNITED STATES PATENTS

| | | | |
|---|---|---|---|
| 2,976,318 | 3/61 | Blackwood | 260—559 |
| 2,984,686 | 5/61 | Blackwood et al. | 260—599 |
| 3,005,024 | 10/61 | Rennhard | 260—559 |
| 3,081,346 | 3/63 | Stephens et al. | 260—559 |

OTHER REFERENCES

Boothe et al.: Journ. Am. Chem. Soc., vol. 82, pages 1253–4 (1960).

IRVING MARCUS, *Primary Examiner*.

WALTER A. MODANCE, *Examiner*.